Figure 3:
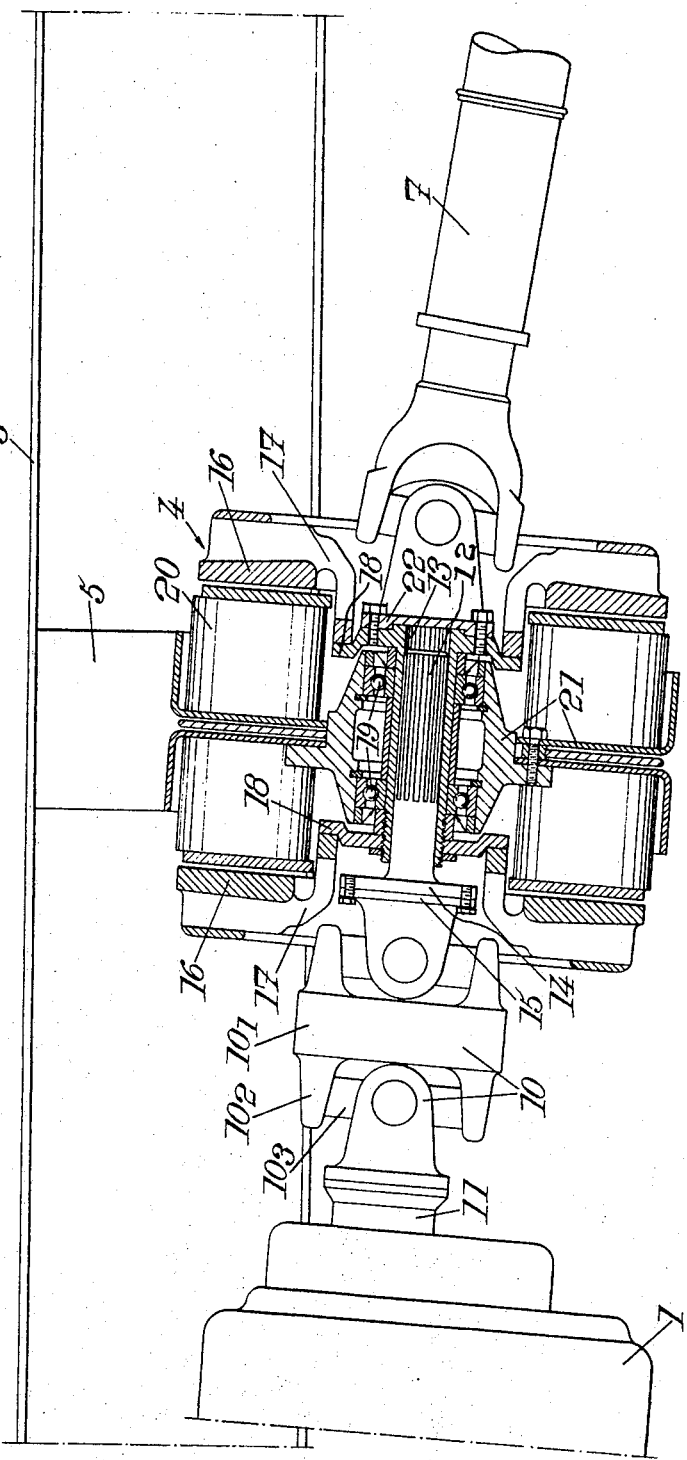

United States Patent [19]
Bessière

[11] 3,871,466
[45] Mar. 18, 1975

[54] TRANSMISSIONS OF VEHICLES EQUIPPED WITH A RETARDER

[75] Inventor: Pierre Etienne Bessière, Golf Saint-nom-la-Breteche, France

[73] Assignee: Labavia S.G.E., Paris, France

[22] Filed: Dec. 4, 1972

[21] Appl. No.: 311,559

[30] Foreign Application Priority Data
Dec. 8, 1971   France .................. 71.44110

[52] U.S. Cl. ............... 180/70 P, 310/93, 188/267
[51] Int. Cl. ................................. B60k 33/00
[58] Field of Search ..... 188/267; 310/93; 180/70 R, 180/71, 43 R, 57

[56] References Cited
UNITED STATES PATENTS

| | | | |
|---|---|---|---|
| 2,968,740 | 1/1961 | Coe et al. ................ | 310/93 |
| 2,971,105 | 2/1961 | Jaeschke .................. | 310/93 |
| 3,157,395 | 11/1964 | Budzynski et al. ........ | 180/43 R |
| 3,160,222 | 12/1964 | Mazziotti ................. | 180/70 R |
| 3,381,152 | 4/1968 | Bessière .................. | 310/93 |

Primary Examiner—Kenneth H. Betts
Assistant Examiner—Jack D. Rubenstein
Attorney, Agent, or Firm—Stevens, David, Miller & Mosher

[57] ABSTRACT

The retarder is interposed between the gear box and the axle of the vehicle. The stator of the retarder is suspended from the chassis of the vehicle independently of the gear box and of the axle and the rotor of the retarder is coupled respectively to the output shaft of the gear box and to the input shaft of the axle through two homokinetic coupling assemblies. The rotor of the retarder comprises a cylindrical internally grooved sleeve open in the direction of the gear box. The homokinetic coupling assembly situated between the gear box and the retarder has a very small and invariable axial size and ends on the side of the retarder in an externally grooved stub shaft axially slidably engaged in said sleeve. The homokinetic coupling assembly can be composed of two cardan joints juxtaposed axially against one another.

8 Claims, 3 Drawing Figures

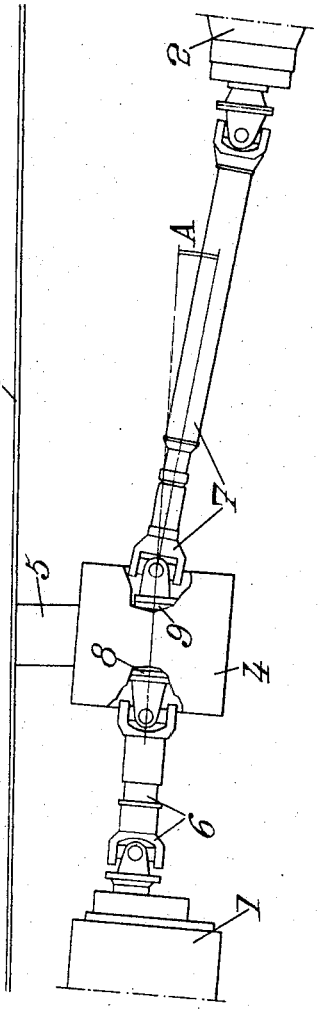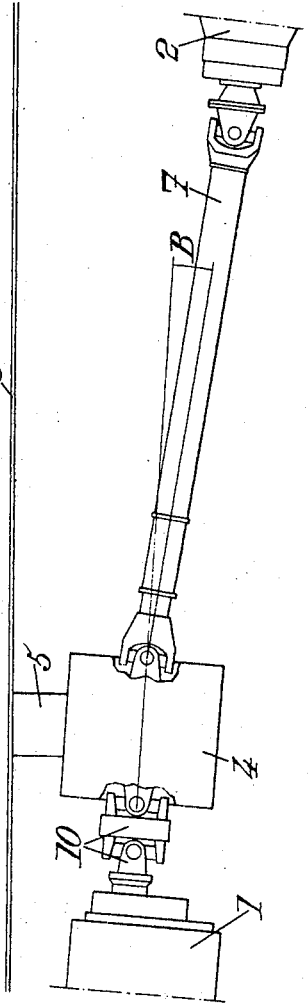

TRANSMISSIONS OF VEHICLES EQUIPPED WITH A RETARDER

The invention relates to transmissions of vehicles equipped with a retarder and interposed between the gear box and axle of these vehicles, and it relates more particularly, among these transmissions, to those for which on one hand the stator of the retarder (called "autonomous") is suspended from the chassis of the vehicle independently of the gear box and of the axle and for which on the other hand, the rotor of the retarder is coupled respectively to the output shaft of the gear box and to the input shaft of the axle through two transversely flexible homokinetic coupling assemblies, preferably of the double cardan type.

It will be recalled that, in known embodiments of such transmissions, the coupling assemblies interposed respectively between the gear box and retarder and between the retarder and the axle are both designed so that their axial length can be slightly modified, for example by several millimeters, on angular oscillations of the transmission, these assemblies being constructed to this end in a telescopically variable manner.

In these assemblies, the transfer of torque from one to the other of the elements which slide with respect to one another is ensured by means of longitudinal grooves or splines.

These grooves have necessarily a certain length - of the order of 25 to 30 cm - so that it is very difficult to reduce the total length of each said coupling to less than 55 cm.

As a result it is practically impossible to equip with relatively powerful retarders having an axial dimension of the order of 40 cm, "short" transmissions in which the distance between the output plate of the gear box and the input plate of the axle is only 1.50 m: the distance of 55 cm which remains in fact available in such a construction for the whole of the coupling interposed between the retarder and the axle, even if it were compatible with the exigencies relating to the construction of this assembly, would be incompatible with the suspension of the axle with respect to the chassis, this suspension then imposing on the assembly concerned, angular oscillations which exceed the permissible maximum for universal joints (generally about 15°).

It it a particular object of the invention to render transmissions of the type concerned such that they respond better to the various exigencies of practice than hitherto, especially as regards their length comprised between the gear box and the retarder being reduced to a very small value.

Transmissions of the type concerned according to the invention are characterised in that on one hand the rotor of the retarder comprises a cylindrical internally grooved sleeve open in the direction of the gear box, which sleeve preferably traverses this rotor axially from one side to the other, and in that on the other hand, the coupling assembly interposed between the gear box and the retarder has a very small and invariable axial dimension and ends on the side of the retarder by an externally grooved stub shaft engaged in the said sleeve so as to be axially slidable in the latter.

In an advantageous embodiment, the retarder is electric and the grooved rotor sleeve of the retarder, mounted inside bearings borne by the stator, carries respectively at its two axial ends two plates themselves each bearing an induction disc of magnetic material in which eddy currents are developed, by means of a ring of fins, preferably incurved, fixed at its periphery.

The invention comprises, apart from these principal features, certain other features which are preferably used at the same time and which will be more explicitly considered below.

In the following there will be described a preferred embodiment of the invention with reference to the accompanying drawings given of course purely by way of illustration and to be considered as in no way limiting.

FIG. 1 of these drawings, shows diagrammatically a transmission of known type.

FIG. 2 shows diagrammatically one embodiment of a transmission according to the invention.

FIG. 3 lastly, shows on a larger scale, in partial axial section, a portion of the transmission shown in FIG. 2, comprising the retarder and its immediate neighbouring portions.

The known transmission shown diagrammatically in FIG. 1 for purposes of comparison comprises, interposed between the gear box 1 of the vehicle and the axle 2 of the latter, which gear box and axle are both connected to the chassis 3 of the vehicle by individual suspension members (not shown), an eddy current retarder 4 of the "autonomous" type, that is to say itself suspended from the chassis 3 by independent suspension member 5, and two homokinetic telescopic transmission assemblies 6 and 7, generally of the double cardan type, interposed respectively, the first between the gear box and the retarder and the second between the retarder and the axle.

The suspension members of the gear box, of the axle and of the retarder on the chassis of the vehicle are independent in that they are provided so as to each transmit to said chassis the forces, especially axial and transversal, developed at its level in the transmission, as well as the reaction torque on the breaking of this transmission without reacting on the others.

This independence, characteristic of "autonomous" retarders, is particularly advantageous in that it enables the gear box and the axle to be relieved from the weight of the retarder - which weight is relatively high for an electric retarder and from the various thrusts due to its presence so that it is not necessary to reinforce this gear box or this axle to render them suitable for supporting such a retarder.

The plates 8 and 9, of the rotor of the retarder 4, on which are respectively fixed the adjacent ends of the two assemblies 6 and 7 remain constantly fast to one another so that their relative axial distance cannot be modified.

Very small variations in axial dimension of the transmission due to its angular oscillations are then rendered possible without risk of stresses or of fracture by the axial distortions of the assemblies 6 and 7.

The telescopic construction of the coupling assembly 6 requires for the latter a relatively considerable length.

Since in practice this assembly 6 is shorter than the other 7, the largest vertical oscillations of the transmission being localised at the level of the axle, this requirement prevents the assembly of relatively powerful "autonomous" retarder that is to say having a relatively large axial bulk (40 cm for example), in very short transmissions, that is to say in which the length comprised between the gear box and the axle drops below 1.50 m.

The vertical oscillations of the axle in service are manifested in fact, for very short transmissions, by large angular oscillations of the axis of the assembly 7 connecting said axle to the speed reducer with respect to the axis of this retarder: these angular oscillations shown by A in FIG. 1 become unacceptable in practice if their maximum amplitude reaches the value of 15°.

To overcome this drawback, according to the invention, there is provided at the level of the speed reducer itself the possibility of axial "respiration" of the transmission which was hitherto localised in the homokinetic coupling assembly connecting the gear box to the retarder.

To this end this assembly is coupled to the rotor of the retarder by a grooved stub shaft mounted slidably in a grooved sleeve of this rotor, and conversely any possibility of telescopic variation is eliminated from said assembly, which is now axially undeformable and can hence be constructed with a very short length.

In the embodiment illustrated in FIGS. 2 and 3 the assembly concerned, denoted by the reference numeral 10, is composed of two cardan joints axially juxtaposed against one another, the central part of the double cardan obtained being in the shape of a disc or a ring $10_1$ on which project axially in two opposite directions two pairs of lugs $10_2$, each of these pairs of lugs being arranged so as to form a double bearing for a cardan joint cross-member arm $10_3$.

The end of the assembly 10, situated on the side of the retarder, is terminated by a cylindrical externally grooved stub shaft 12, mounted slidably in an internally grooved sleeve 13, forming part of the rotor of the retarder 4.

The stub shaft 12 is advantageously connected to the corresponding end of the assembly 10 by mutual bolting of two plates 14 and 15 fast respectively to this stub shaft and to this end.

Outside this sleeve 13, the retarder itself can be constituted in any desirable manner.

It comprises advantageously two induction discs 16 of magnetic material in which eddy currents are developed, borne respectively, by means of two crowns of bent fins 17, by the peripheries of two plates 18 fast respectively to the two axial ends of the sleeve 13, this sleeve being itself housed in at least two bearings 19 borne, as well as the induction coils 20, by a central stator structure 21.

The coupling of the rotor of the retarder to the coupling assembly 7 situated on the side of the axle is ensured by bolting of the plate 18 situated on this side to a contiguous plate 22 belonging to said assembly 7.

With such mounting, the whole of the axial oscillations of the transmission are flexibly absorbed, either by telescopic variations of the assembly 7 for those which are generated between the retarder and the axle, or by the sliding of the stub shaft 12 in the sleeve 13 for those deformations localised between the gear box and the retarder.

This solution does not lengthen the retarder axially.

Since this also permits considerable reduction in the axial length of the coupling 10, it enables the coupling 7 to be all the longer, for a given distance between the gear box and the axle.

By way of illustration, taking the above numerical example, a gain of 30 cm in the length of the coupling 10 (which length then diminishes from 55 to 25 cm) permits the coupling 7 to be that much longer, that is to say to be increased in length from 55 to 85 cm, which considerably reduces the maximum amplitude of the angular oscillations, shown by B in FIG. 2, of the axle of this assembly with respect to the axles of the members between which it forms a coupling.

In other words, due to the assembly of the invention, and whatever the embodiment adopted, it is made possible to use, in particularly short transmissions, "autonomous" retarders, having even a relatively large axial size and hence being relatively powerful - which use could not have been contemplated with conventional assemblies.

As is self-evident, and as emerges already from the foregoing, the invention is in no way limited to those of its types of application and embodiments which have been more especially envisaged; it encompasses, on the contrary, all modifications. Such modifications include especially those in which one at least of the coupling assemblies 7 and 10 would not include a double cardan, but another homokinetic coupling member (homokinetism having the purpose of avoiding any "pulsed" transfer of torque, capable of generating vibrations prejudicial to the life of the grooves), for example a flexible coupling with convex teeth. Included also are such modifications in which the retarder would be not electric, but hydraulic and preferably of such weight that they would not lend themselves to overhanging assembly on the gear box.

I claim:

1. Vehicle transmission equipped with a retarder interposed between the gear box and the axle of this vehicle, in which the stator of the retarder is suspended from the chassis of the vehicle independently of the gear box and of the axle and in which the rotor of the retarder is coupled respectively to the output shaft of the gear box and to the input shaft of the axle through two homokinetic coupling assemblies, the rotor of the retarder comprising a cylindrical internally grooved sleeve open in the direction of the gear box and mounted inside bearings borne by said stator and bearing respectively at its two axial ends two plates each bearing an induction disc through a crown of fins fixed at the periphery of the plate, the plate arranged on the side of the axle being bolted to a plate which forms part of the homokinetic coupling assembly arranged between the retarder and the axle, the homokinetic coupling assembly being situated between the gear box and the retarder and having a very small and invariable axial size, and an externally grooved stub shaft axially slidably engaged in said sleeve terminating said homokinetic coupling assembly on the side of the retarder.

2. Transmission according to claim 1, wherein the very short homokinetic coupling assembly comprises two cardan joints juxtaposed axially against one another.

3. Transmission according to claim 2, wherein the grooved sleeve traverses the rotor of the retarder axially from one side to the other.

4. Transmission according to claim 2, wherein the grooved stub shaft is coupled to the corresponding end of the very short homokinetic coupling assembly by mutual bolting of two plates fast respectively to said stub shaft and to said corresponding end.

5. Transmission according to claim 1, wherein the grooved sleeve traverses the rotor of the retarder axially from one side to the other.

6. Transmission according to claim 5, wherein the grooved stub shaft is coupled to the corresponding end of the very short homokinetic coupling assembly by mutual bolting of two plates fast respectively to said stub shaft and to said corresponding end.

7. Transmission according to claim 1, wherein the grooved stub shaft is coupled to the corresponding end of the very short homokinetic coupling assembly by mutual bolting of two plates fast respectively to said stub shaft and to said corresponding end.

8. Transmission according to claim 1, wherein the retarder is electric.

* * * * *